(12) United States Patent
Malik et al.

(10) Patent No.: US 12,129,753 B2
(45) Date of Patent: Oct. 29, 2024

(54) DEVICE AND METHOD TO IMAGE FLOW IN OIL AND GAS WELLS USING PHASED ARRAY DOPPLER ULTRASOUND

(71) Applicant: DarkVision Technologies Inc, North Vancouver (CA)

(72) Inventors: Osman S. Malik, Vancouver (CA); Graham T. Manders, North Vancouver (CA); Stephen E. Robinson, North Vancouver (CA)

(73) Assignee: DarkVision Technologies Inc., North Vancouver (CA)

( * ) Notice: Subject to any disclaimer, the term of this patent is extended or adjusted under 35 U.S.C. 154(b) by 0 days.

(21) Appl. No.: 18/118,138

(22) Filed: Mar. 7, 2023

(65) Prior Publication Data
US 2023/0203942 A1    Jun. 29, 2023

Related U.S. Application Data

(63) Continuation of application No. 17/389,918, filed on Jul. 30, 2021, now Pat. No. 11,619,125, which is a
(Continued)

(51) Int. Cl.
*E21B 47/107* (2012.01)
*E21B 43/26* (2006.01)
(Continued)

(52) U.S. Cl.
CPC ............ *E21B 47/107* (2020.05); *E21B 43/26* (2013.01); *E21B 47/0025* (2020.05);
(Continued)

(58) Field of Classification Search
CPC .. E21B 47/107; E21B 47/0025; E21B 47/002; E21B 43/26; E21B 43/11;
(Continued)

(56) References Cited

U.S. PATENT DOCUMENTS

| 3,901,078 | A | | 8/1975 | Mcshane | |
|---|---|---|---|---|---|
| 4,905,203 | A | * | 2/1990 | Sims | ........................ G01F 1/66 340/856.4 |

(Continued)

FOREIGN PATENT DOCUMENTS

| CN | 200985790 Y | 12/2007 |
|---|---|---|
| CN | 101363314 A | 2/2009 |

(Continued)

OTHER PUBLICATIONS

Archer the Well Company. "Captured By Space, 3D Perspective on Well Performance", Space Brochure RO Jan. 2011.

(Continued)

*Primary Examiner* — Christopher J Sebesta

(57) ABSTRACT

A device and method for imaging, measuring and identifying multiphase fluid flow in wellbores using phased array Doppler ultrasound. The device includes a radially-configured or ring-shaped ultrasound transducer that when deployed in a well in Doppler mode can measure the velocity of radially flowing fluids in the wellbore and generate a 3D image of radial flow in the wellbore, including flowback into the wellbore after fracturing operations, or flow leaving the wellbore during water injection operations. The ring-shaped ultrasound transducer can also simultaneously operate in a B-mode to generate a B-mode image of the wellbore liner upon which the Doppler image can be overlaid. The device may also include a forward facing ultrasound transducer either instead of or in place of the ring-shaped transducer for obtaining information and images on axial flow in the wellbore in Doppler mode, and the location of phase boundaries and phase locations in B-mode.

20 Claims, 5 Drawing Sheets

Related U.S. Application Data continuation of application No. 15/558,946, filed as application No. PCT/CA2016/050283 on Mar. 15, 2016, now Pat. No. 11,092,002.

(60) Provisional application No. 62/133,586, filed on Mar. 16, 2015.

(51) Int. Cl.
| | |
|---|---|
| *E21B 47/002* | (2012.01) |
| *G01F 1/663* | (2022.01) |
| *G01F 1/74* | (2006.01) |
| *G01S 15/88* | (2006.01) |
| *G01S 15/89* | (2006.01) |
| *E21B 43/11* | (2006.01) |

(52) U.S. Cl.
CPC .............. *G01F 1/663* (2013.01); *G01F 1/74* (2013.01); *G01S 15/88* (2013.01); *G01S 15/8922* (2013.01); *G01S 15/8929* (2013.01); *G01S 15/8979* (2013.01); *E21B 43/11* (2013.01)

(58) Field of Classification Search
CPC . G01F 1/663; G01F 1/74; G01S 15/88; G01S 15/8922; G01S 15/8929; G01S 15/8979
See application file for complete search history.

(56) References Cited

U.S. PATENT DOCUMENTS

| | | | | |
|---|---|---|---|---|
| 4,947,683 | A * | 8/1990 | Minear | ........... E21B 47/107 73/152.32 |
| 5,555,534 | A * | 9/1996 | Maslak | ............... G01S 15/8979 367/7 |
| 5,640,371 | A | 6/1997 | Schmidt et al. | |
| 6,171,248 | B1 * | 1/2001 | Hossack | ............ G01S 15/8915 600/447 |
| 6,287,260 | B1 * | 9/2001 | Hascoet | ................... A61B 8/06 600/465 |
| 6,295,872 | B1 | 10/2001 | Van Der Heide | |
| 6,483,777 | B1 | 11/2002 | Zeroug | |
| 6,829,947 | B2 | 12/2004 | Han et al. | |
| 6,909,666 | B2 | 6/2005 | Dubinsky et al. | |
| 6,985,086 | B2 | 1/2006 | Tang et al. | |
| 7,460,435 | B2 | 12/2008 | Garcia-osuna et al. | |
| 7,513,873 | B2 | 4/2009 | Shifrin | |
| 7,617,052 | B2 | 11/2009 | Van Kuijk et al. | |
| 7,626,886 | B2 | 12/2009 | Dubinsky et al. | |
| 8,260,554 | B2 | 9/2012 | Morys | |
| 8,294,758 | B2 | 10/2012 | Lynde | |
| 8,611,183 | B2 | 12/2013 | Winkler et al. | |
| 8,923,092 | B2 | 12/2014 | Vu et al. | |
| 2009/0213690 | A1 | 8/2009 | Steinsiek et al. | |
| 2010/0102986 | A1 | 4/2010 | Benischek et al. | |
| 2010/0230114 | A1 | 9/2010 | Jennings | |
| 2010/0258303 | A1 | 10/2010 | Alberty | |
| 2011/0087434 | A1 | 4/2011 | Lie | |
| 2011/0139442 | A1 | 6/2011 | Ziauddin et al. | |
| 2012/0120767 | A1 | 5/2012 | Vu et al. | |
| 2012/0127830 | A1 | 5/2012 | Desai | |
| 2012/0150515 | A1 | 6/2012 | Hariharan et al. | |
| 2012/0176862 | A1 | 7/2012 | D'Angelo et al. | |
| 2012/0179377 | A1 | 7/2012 | Lie | |
| 2013/0299174 | A1 | 11/2013 | Baski | |
| 2014/0050046 | A1 | 2/2014 | Sinha et al. | |
| 2014/0260589 | A1 * | 9/2014 | Hallundbæk et al. | .. G01F 1/667 73/152.32 |
| 2015/0198733 | A1 | 7/2015 | Lie | |
| 2015/0331134 | A1 * | 11/2015 | Haldorsen | ............ E21B 47/005 367/35 |
| 2016/0290847 | A1 | 10/2016 | Gronsberg | |

FOREIGN PATENT DOCUMENTS

| | | |
|---|---|---|
| CN | 202943014 U | 5/2013 |
| CN | 102128028 B | 6/2013 |
| CN | 102128029 B | 6/2013 |
| EP | 2587227 A1 | 5/2013 |
| NO | 20131637 A1 | 6/2015 |
| NO | 338464 B1 | 8/2016 |
| WO | 2009099333 A1 | 8/2009 |
| WO | 2013101694 A2 | 7/2013 |
| WO | 2015088351 A1 | 6/2015 |

OTHER PUBLICATIONS

Elkadi & Zeybek, "A New Era in Production Logging: Defining Downhole Flow Profiles", Middle East & Asia Reservoir Review, pp. 6-21, Nov. 7, 2006.

International Preliminary Report received for PCT Application No. PCT/CA2016/050283, mailed on Sep. 28, 2017, 07 Pages.

International Search Report and Written Opinion received for PCT Application No. PCT/CA2016/050283, mailed on May 30, 2016, 09 Pages.

Morriss et al., "Ultrasonic Imaging and Velocimetry in Two-Phase Pipe Flow", Journal of Energy Resources Technology, vol. 115, pp. 108-116, Jun. 1993.

Third Party Observation filed on PCT/CA2016/050283, Jul. 13, 2017.

* cited by examiner

DEVICE AND METHOD TO IMAGE FLOW IN OIL AND GAS WELLS USING PHASED ARRAY DOPPLER ULTRASOUND

RELATED APPLICATIONS

This application is a continuation of U.S. application Ser. No. 17/389,918 filed Jul. 30, 2021, which is a continuation of U.S. application Ser. No. 15/558,946 filed Sep. 15, 2017, which is a National Stage Entry of International Application PCT/CA2016/050283 filed Mar. 15, 2016 and claims priority from Provisional Application 62/133,586 filed Mar. 16, 2015. All of the aforementioned applications are incorporated by reference in their entireties.

FIELD OF THE INVENTION

The invention relates generally to determining flow in wellbores, and more specifically to imaging, measuring and identifying, flow, boundary layers and hold-up zones in wellbores using phased array Doppler ultrasound.

BACKGROUND OF THE INVENTION

Measuring fluid flow rates and fluid properties in oil and gas wellbores has been of interest to the oil and gas industry for many years. The identification of fluid types and measurements of fluid flow rates is commonly referred to as production logging, and generally provides this information at various depths along, the length of the wellbore. Fluid flow information is valuable in assessing well performance and identifying possible problems, as well as identifying where various fluids enter and leave the well. This information is useful in deciding if certain zones should be shut off if unwanted fluid entry is occurring (e.g. water producing zones), or if certain zones should be perforated and/or stimulated if they are under-producing.

As discussed in the Elkadi, A. and Zeybek, M. ("A new era in production logging: defining downhole flow profiles", *Middle East & Asia Reservoir Review*, Number 7, 2006, May 21), early well flow measurement techniques focused on determining fluid velocity in a wellbore using a single, centrally positioned propeller, commonly called a spinner. A single spinner generally assumes that the flow along the axis of the wellbore is uniform and of a single fluid type, making this method better suited for vertical wells. These systems are often inaccurate and/or unreliable in horizontal or deviated wells as stratified layers of fluid exist with multiphase flow patterns which can include separate oil, water and gas phases. These fluid layers can both be flowing at different rates and even in different directions, making a single point measurement inaccurate and ineffective.

Multiphase flow is much more complicated to measure than single-phase flow due to factors such as holdup, slippage velocity and phase segregation. Holdup is defined as the percentage by volume of the borehole contents (i.e. gas, oil and water) measured over a cross-sectional area (i.e. the inner diameter of the production string), and can vary greatly throughout the wellbore. Slippage velocity is the amount by which light phases move faster than heavier phases. Phase segregation occurs due to the immiscibility of water and oil, and the limited miscibility of gas in oil and water which is temperature and pressure dependent.

To determine flow rates for oil, water and gas throughout a horizontal or deviated wellbore, it is generally necessary to identify and map fluid velocities and holdup throughout the entire wellbore, which may be many kilometers long. This can be an extremely complex task, for which conventional production logging tools, such as spinners, are generally inadequate for. Accordingly, there is a need for improved tools and methods for measuring and understanding downhole fluid flow in horizontal and deviated wells having complex, multiphase flow and multiple entry points into the well (also known as stages).

The subject invention provides a device and method for measuring and understanding multiphase flow in wellbores using phased array Doppler ultrasound techniques.

A review of the prior art reveals U.S. Pat. No. 6,171,88 and U.S. Pat. No. 7,513,873 which relate to the use of phased array ultrasound imaging that may use Doppler techniques for medical imaging purposes. U.S. Pat. No. 6,829,947, EP Patent No. 2,587,227 and U.S. Pat. No. 4,905,203 teach the measurement of downhole fluid flow using Doppler techniques. Morriss & Hill ("Ultrasonic imaging and velocimetry in two-phase pipe flow", Journal of Energy Resources Technology, June 1993, Vol. 115, 108-116) provides information on the use of ultrasonic measurements in multiphase pipe flow. U.S. Pat. No. 5,640,371 provides a method and apparatus for acoustic imaging using beam focusing, beam steering and amplitude shading to increase image resolution and overcome side lobe effects, which may be used in pipelines. Chinese Patent Application No. 101363314 and Chinese Patent. No. 200985790 teach the use of phased array ultrasound to image oil wells. Chinese Patent No. 202943014 describes a phase control round arc array sound wave radiation unit that may be used for acoustic logging. Archer The Well Company teaches the use of phased array ultrasound technology for well imaging (Archer The Well Company, The Space Series Brochure, R01/2011).

There continues to be a need for improved tools and methods for measuring and understanding downhole fluid flow in horizontal and deviated wells having complex, multiphase flow, which the subject invention provides.

SUMMARY OF THE INVENTION

In accordance with the invention, there is provided a device for measuring fluid flow in a wellbore comprising a phased array ultrasonic imaging system operable in Doppler mode for measuring fluid velocities in the wellbore.

In one embodiment, the imaging system is operable in B-mode for generating a B-mode image of the wellbore.

In a farther embodiment, the imaging system comprises a ring-shaped transducer array for emitting waves radially outward from the device for measuring radial fluid flow into and out of the wellbore in Doppler mode. The ring-shaped transducer array may be operable in B-mode for generating a B-mode image showing the structure of the wellbore.

In yet another embodiment, the imaging system comprises a downhole tool having a downhole-facing ultrasound transducer array for emitting Ultrasound waves in Doppler mode in a downhole direction; electronics for receiving ultrasound reflections and recording them as Doppler mode data on a memory of the tool; at least one resistive, capacitive, or optical sensor exposed to a multiphase fluid in the wellbore; and a processor arranged for processing a) the Doppler mode data to calculate axial fluid flow in the wellbore, b) for identifying phase boundaries in the multiphase fluid in the wellbore and c) and for generating an image representing the calculated axial fluid flow and identified phase boundaries.

In one embodiment, the transducer array is operable simultaneously in Doppler mode and B-mode for generating a Doppler image overlaid on a B-mode image.

In yet another embodiment, the imaging system comprises a ring-shaped transducer array for emitting waves radially outward from the device for measuring radial fluid flow into and out of the wellbore in Doppler mode; and a downhole facing transducer array for emitting waves axially in a downhole direction for measuring axial fluid flow in the wellbore in Doppler mode. The ring-shaped transducer array may be operable in B-mode for generating a B-mode image showing the structure of the wellbore, and the downhole facing transducer array may be operable in B-mode for identifying phase boundaries of multiphase fluid in the wellbore. The ring-shaped transducer array and the downhole facing transducer array may be operable simultaneously, and in both Doppler mode and B-mode for generating a 3D image of the wellbore showing the wellbore geometry, radial fluid flow, axial fluid flow and phase boundaries.

In one embodiment, the transducer array or arrays each comprise 128 to 1024 individual transducer elements.

In another embodiment, the ultrasonic wave frequency of the imaging system is adjustable based on a velocity of the device and/or the fluids in the wellbore.

In yet another embodiment, the device further comprises a centralizing element for keeping the device in the center of the wellbore. The device may also Farther comprise an isolation element located upstream of the imaging system for integrating the imaging system into fracturing operations. A perforating system may be located uphole of the isolation element.

In one embodiment, the device includes a deployment system for running the device into the wellbore and removing the device from the wellbore.

In another embodiment, the device further comprises at least one mechanical spinner for calibrating the device for flow velocity. The device may also include at least one resistive, capacitive, or optical sensor for calibrating the device for the identification of phase boundaries.

In accordance with another aspect of the invention, there is provided a method for measuring fluid flow in a wellbore comprising the steps of a) traversing a phased array ultrasonic imaging, system through the wellbore while running the imaging system in Doppler mode to obtain velocity measurements of the wellbore fluid; and b) generating a three-dimensional Doppler image of the wellbore showing fluid velocity in the wellbore.

In one embodiment, in step a), the imaging, system is simultaneously run in B-mode to obtain acoustical impedance measurements in the wellbore, and further comprises the steps of generating a three-dimensional B-mode image of the wellbore, and overlaying the Doppler image on the B-mode image.

In another embodiment, in step a), the imaging system transmits and receives ultrasonic waves in a radial direction and obtains velocity measurements of radially flowing fluid in the wellbore. The B-mode may generate an image of the wellbore In a further embodiment, in step a), the imaging, system transmits and receives ultrasonic waves in an axial direction and obtains velocity measurements of axially flowing fluid in the wellbore. The B-mode may generate an image of the wellbore contents showing fluid phase boundaries.

In a further aspect of the invention, there is provided a method for measuring fluid flowback into a wellbore completion after fracturing operations comprising the steps of: a) conveying an imaging device into a first zone in the wellbore, the device having an imaging system, and an isolating element located uphole from the imaging system, the imaging system including a ring-shaped phased array ultrasound transducer operable in a Doppler mode; b) setting the isolating element to seal a downhole section of the wellbore containing the imaging system from an uphole section of the wellbore; c) perforating the wellbore casing or liner uphole of the isolation element; d) injecting fracturing fluid into the wellbore to fracture a hydrocarbon formation adjacent the first zone; e) upsetting the isolating element and moving the imaging device uphole while operating the transducer in Doppler mode to obtain the velocity of flowback fluids into the wellbore casing or liner from the fractured formation; and f) generating a three-dimensional Doppler image of the wellbore casing or liner showing the flowback velocity.

In one embodiment, the method further comprises in step e), simultaneously operating the transducer in a B-mode and generating a three-dimensional B-mode image of the wellbore casing or liner; and in step f), overlaying the Doppler image on the B-mode image.

In another embodiment, the method further comprises after step c), step c.i) unsetting the isolating element and moving the imaging device uphole while operating the transducer in Doppler mode to obtain the velocity of fluids flowing into the perforated wellbore casing or liner prior to fracturing operations.

In yet another embodiment, the method further comprises in step c.i) operating the transducer in B-mode simultaneously to Doppler mode to generate a B-mode image showing the condition of the wellbore casing or liner and perforations prior to fracturing operations.

In a further embodiment, the method comprises repeating all the steps at a second zone in the wellbore.

BRIEF DESCRIPTION OF THE DRAWINGS

Various objects, features and advantages of the invention will be apparent from the following description of particular embodiments of the invention, as illustrated in the accompanying, drawings. The drawings are not necessarily to scale, emphasis instead being placed upon illustrating the principles of various embodiments of the invention. Similar reference numerals indicate similar components.

DETAILED DESCRIPTION OF THE INVENTION

Various aspects of the invention will now be described with reference to the figures. For the purposes of illustration, components depicted in the figures are not necessarily drawn to scale. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

With reference to the figures, a device and method for imaging flow in oil and gas wells using phased array Doppler ultrasound is described. Phased array ultrasound is an advanced method of ultrasonic imaging employed in the medical and industrial fields that has several advantages over conventional non-phased array ultrasound technology. Conventional (i.e. non phased array) ultrasound technology uses a monolithic probe having a single element that emits a beam in a fixed direction. To test or interrogate a large volume of material, the probe must be mechanically steered to sweep the beam through the area of interest. In contrast, a phased array ultrasound system uses a probe having multiple elements generally arranged in parallel. Through sequential activation/pulsing of each element, a beam from the probe can be electronically steered at high speed through a wide two-dimensional area without having to move the probe.

Ultrasound systems can generally be operated in several modes. One of the most common modes is B-mode (brightness mode), also referred to as 2D mode. To form a B-mode image, a cross-sectional plane through an object (or tissue in the case of medical imaging) is scanned to measure the acoustical impedances in the plane. A B-mode image is formed to display the results to provide a visual reference of the structures located in the scanned area based on their acoustic impedances.

Another mode for ultrasonic imaging systems include Doppler mode which uses the Doppler effect to calculate the velocity of fluids in a scanned area. The flow information collected from Doppler ultrasound can be displayed graphically using spectral Doppler, or as an image using color Doppler. In a color Doppler image, different colors represent different fluid speeds and directions. Color Doppler images are generally portrayed on top of B-mode images to provide a visual of the fluid flow in an area. Doppler ultrasound is most commonly used in medical imaging for determining blood flow.

Figure 1:
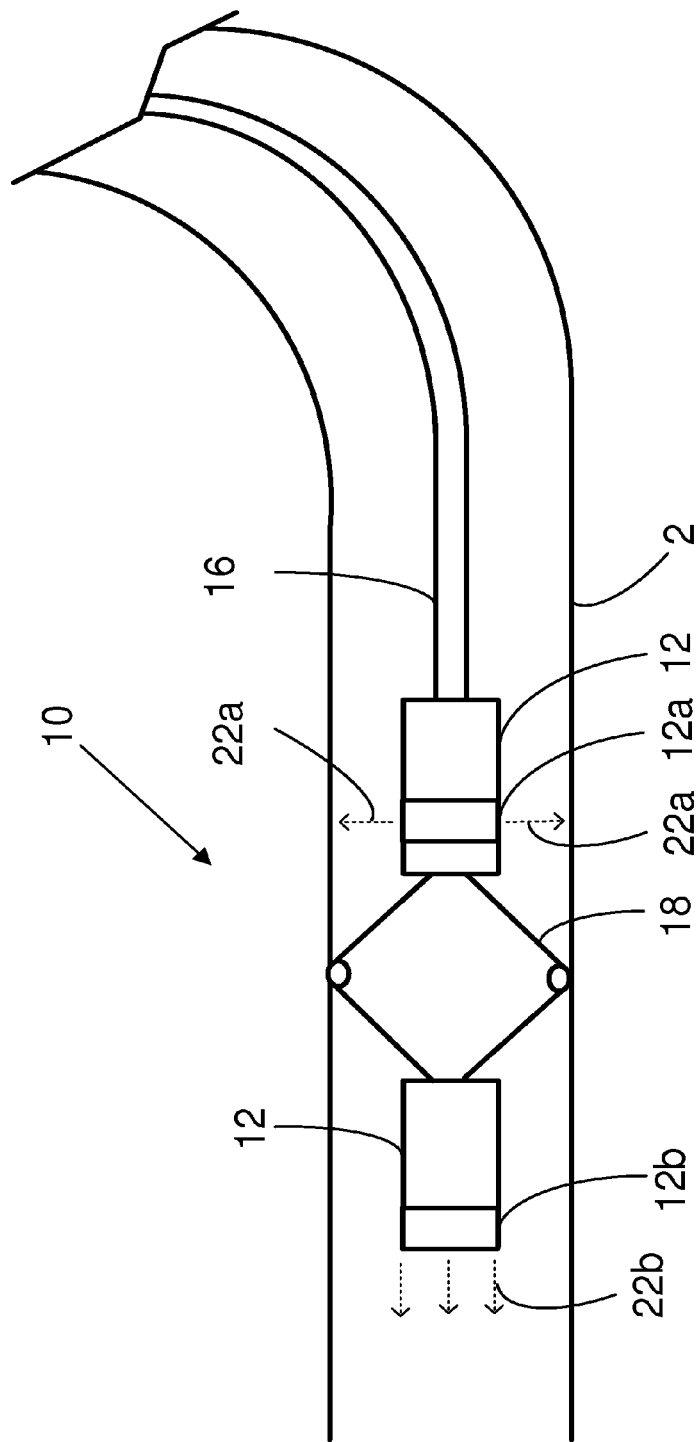
FIG. 1 is a cross-sectional view of an imaging device deployed in a wellbore in accordance with one embodiment of the invention.

In accordance with one embodiment of the invention, there is provided an imaging device 10 for measuring flow in a wellbore 2, illustrated in FIG. 1. The imaging device 10 generally comprises at least one imaging system 12, a deployment system 16, and optionally one or more centralizing elements 18.

Imaging System of Device

The imaging system 12 comprises at least one phased array ultrasonic transducer having a plurality of transducer elements. The imaging system can he operated in more than one mode, including Doppler mode and B-mode.

In the Doppler mode, the imaging system is used primarily to identify and measure the speed and direction of fluid flow in the wellbore. In the Doppler mode, the transducer elements are pulsed in sequence to create a focused ultrasonic wave front directed outward from the transducer. When the wave front is reflected by fluid back to the transducer, the frequency shift of the wave front is detected by electronics in the imaging, system. A processor uses Doppler calculations to compute the velocity of the encountered fluid(s) based on the measured frequency shifts. The imaging device is traversed through the wellbore taking continuous flow measurements using the phased array ultrasonic transducer in Doppler mode. The flow measurements are compiled and can be displayed on a screen as a Doppler image, such as a color Doppler image, providing a detailed three-dimensional (3D) map illustrating fluid flow throughout the wellbore. Since the transducer does not detect fluid flow perpendicular to the direction of the emitted wave front, the orientation of the transducer and wave front can be tailored based on the desired flow measurements.

The imaging system 12 and transducer array are also operable in B-mode to obtain data on the acoustic impedances encountered in a cross-section of the wellbore, which can be used to generate a two-dimensional B-mode image of the cross-section of the wellbore. By traversing the imaging device through the wellbore while running the phased array ultrasound transducer in B-mode, a three-dimensional B-mode image of the wellbore can be generated to show the different acoustic impedances encountered throughout the wellbore. The B-mode image of the wellbore is primarily used to determine the structure and condition of the wellbore, including any perforations and openings in the wellbore liner, and to locate and identify boundaries between fluid types, i.e. phase boundaries between layers of gas, water and oil based on the different acoustic impedances of the fluids.

The transducer array can be run in Doppler mode or in B-mode, or simultaneously in B-mode and Doppler mode by interlacing the B-mode lines and Doppler pulses. When running the transducer array in both B-mode and Doppler mode, the images can be matched to create a hybrid image having a Doppler flow image, such as a color Doppler image, overlaid on a B-mode image.

The imaging system may include multiple transducers oriented in different directions to encompass different aspects of fluid flow in the wellbore, or there may be multiple imaging systems. Specific configurations for imaging systems are discussed in more detail below. The imaging system includes the necessary power, telemetry, memory and electronics for generating, storing and communicating ultrasound images from the transducer.

The frequency of the ultrasound waves generated by the transducer(s) in B-mode and/or Doppler mode is generally in the range of 200 kHz to 30 MHz, and may be dependent upon several factors, including the fluid types and velocities in the wellbore and the speed at which the imaging device is moving. In most uses, the wave frequency is 1 to 10 MHz. The frequency can be manually or automatically changed based on the velocity of the device and/or fluids in the wellbore.

The number of individual elements in the transducer array affects the resolution of the generated images. Typically, each transducer array is made up of 32 to 2048 elements and preferably 128 to 1024 elements. The use of a relatively large number of elements generates a tine resolution image of the wellbore.

Figure 2:
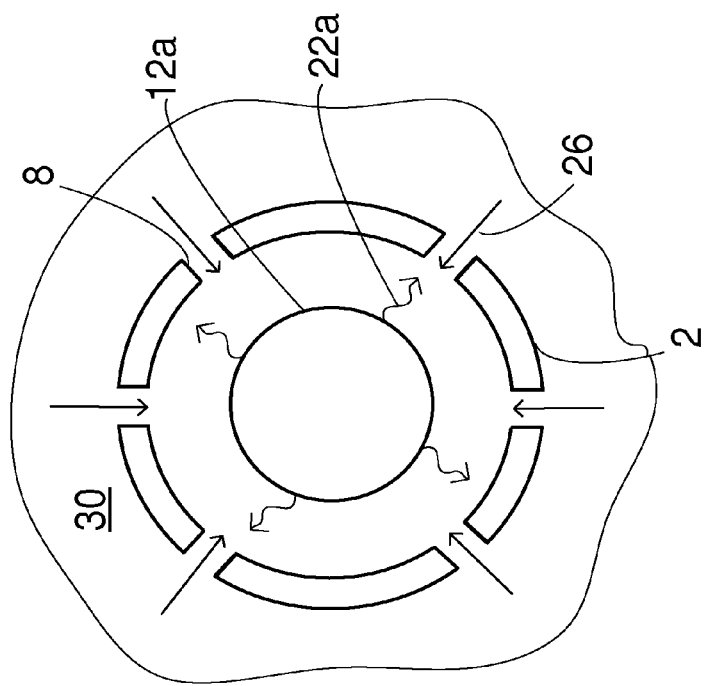
FIG. 2 is a cross-sectional view taken along line A-A in FIG. 3 of an imaging device having a radially configured phased array ultrasonic transducer located in a wellbore with perforations in accordance with one embodiment of the invention.

Imaging System Having a Radially Configured Phased Array Ultrasonic Transducer In one embodiment of the invention, the imaging system 12 comprises a radially-configured or ring-shaped phased array ultrasonic transducer 12a that emits waves radially outwards from the imaging device 10 towards the walls of the wellbore 2, shown by arrows 22a in FIG. 1 and FIG. 2. The ring-shaped transducer can image a ring-shaped cross section of the wellbore covering 360° around the device. As the device is moved axially in the wellbore, in either a downhole or uphole direction, the ring-shaped transducer continually images cross-sections of the wellbore that are perpendicular to the longitudinal axis of the wellbore and generates a 3D image of the wellbore. The ring-shaped transducer may be oriented such that it is concentrically aligned with the wellbore wall (i.e. the transducer array radiates outwards perpendicular to the longitudinal axis of the imaging device which is aligned with the longitudinal axis of the wellbore), or the radial/ring-shaped transducer can be angled uphole or downhole to form an oblique shaped cone. In the preferred embodiment, the radially-configured transducer is angled at approximately 10 to 30 degrees.

Figure 3:
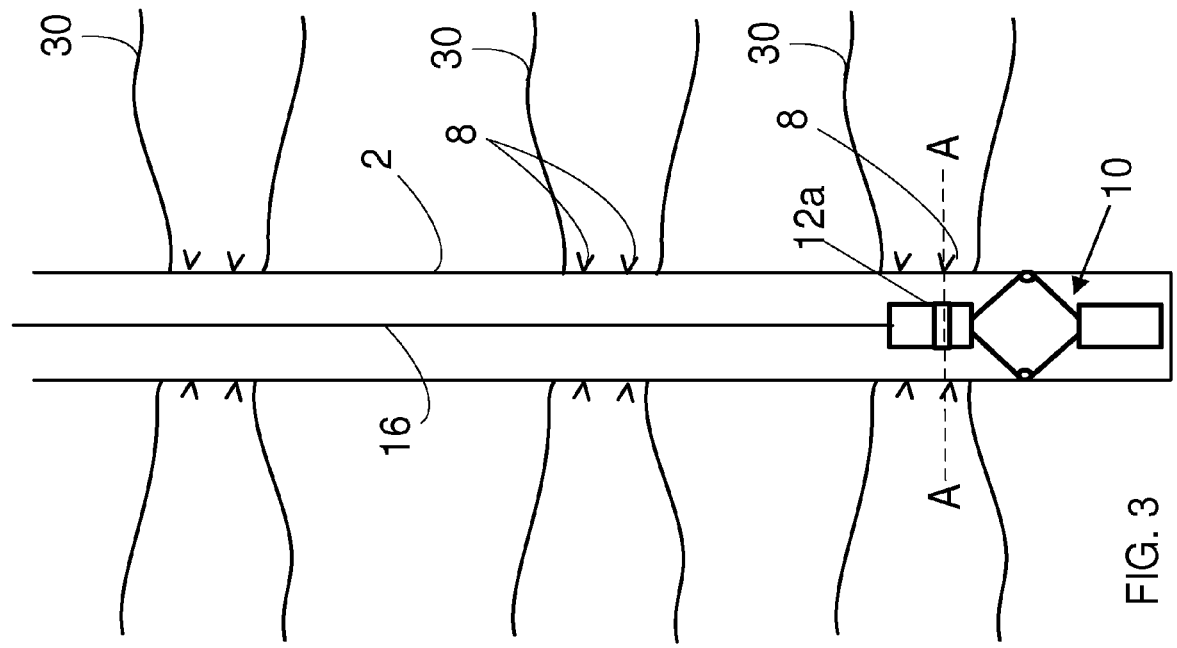
FIG. 3 is a cross-sectional view of a wellbore having multiple production zones with an imaging device deployed in the wellbore in accordance with one embodiment of the invention.

In operation, the imaging device 10 having a radial transducer 12a is deployed down a wellbore 2 having a number of production zones or stages 30 in the adjacent formation, as shown in FIG. 3, with each zone/stage having multiple perforations 8 in the wellbore liner. While FIG. 3 illustrates a vertical wellbore, the wellbore could also be horizontal or deviated.

When operating in the Doppler mode, the radial transducer identifies and measures radial fluid flow 26 in the wellbore that is entering and/or leaving the well through individual perforations or openings. The information is used to generate a Doppler image providing detailed information on radial flow entering or leaving the wellbore from the producing formation. This information is very valuable and can be used to design better wells, shut off water producing zones and optimize well production. The imaging device can be used in horizontal and deviated wells having stratified and multiphase flow, as well as vertical wells having multiple production zones.

The radial transducer can also be operated in B-mode to generate a B-mode image of the wellbore showing the acoustical impedances encountered. The B-mode image of the radial transducer is particularly useful in determining the integrity of the liner walls and individual perforations. The Doppler and B-mode images can be overlaid to provide a 3-D illustration of the wellbore and radial flow in the wellbore.

Use of Radially Configured Phased Array Ultrasonic Transducer for Determining Flowback One specific application for the imaging device 10 having a radially configured transducer array 12a is in determining "flowback" into the wellbore from the production zone after hydraulic fracturing operations. To measure flowback, the imaging system with the ring-shaped transducer array is conveyed to a fractured area in the wellbore immediately after a fracturing operation has occurred, and the radial flow (i.e. the flowback) into the wellbore from the formation through the newly created perforations or openings is identified and measured in the Doppler mode. Flowback information is valuable for assessing the effectiveness of the fracturing operation and the fluids located in the recently fractured production zone.

Optionally, when measuring flowback in the Doppler mode, a B-mode image can be simultaneously generated to show the condition and integrity of the well liner and each individual perforation. This information can be useful in assessing the effectiveness of the perforating operation and whether the liner string has incurred any damage during perforating and fracturing.

Figure 4:
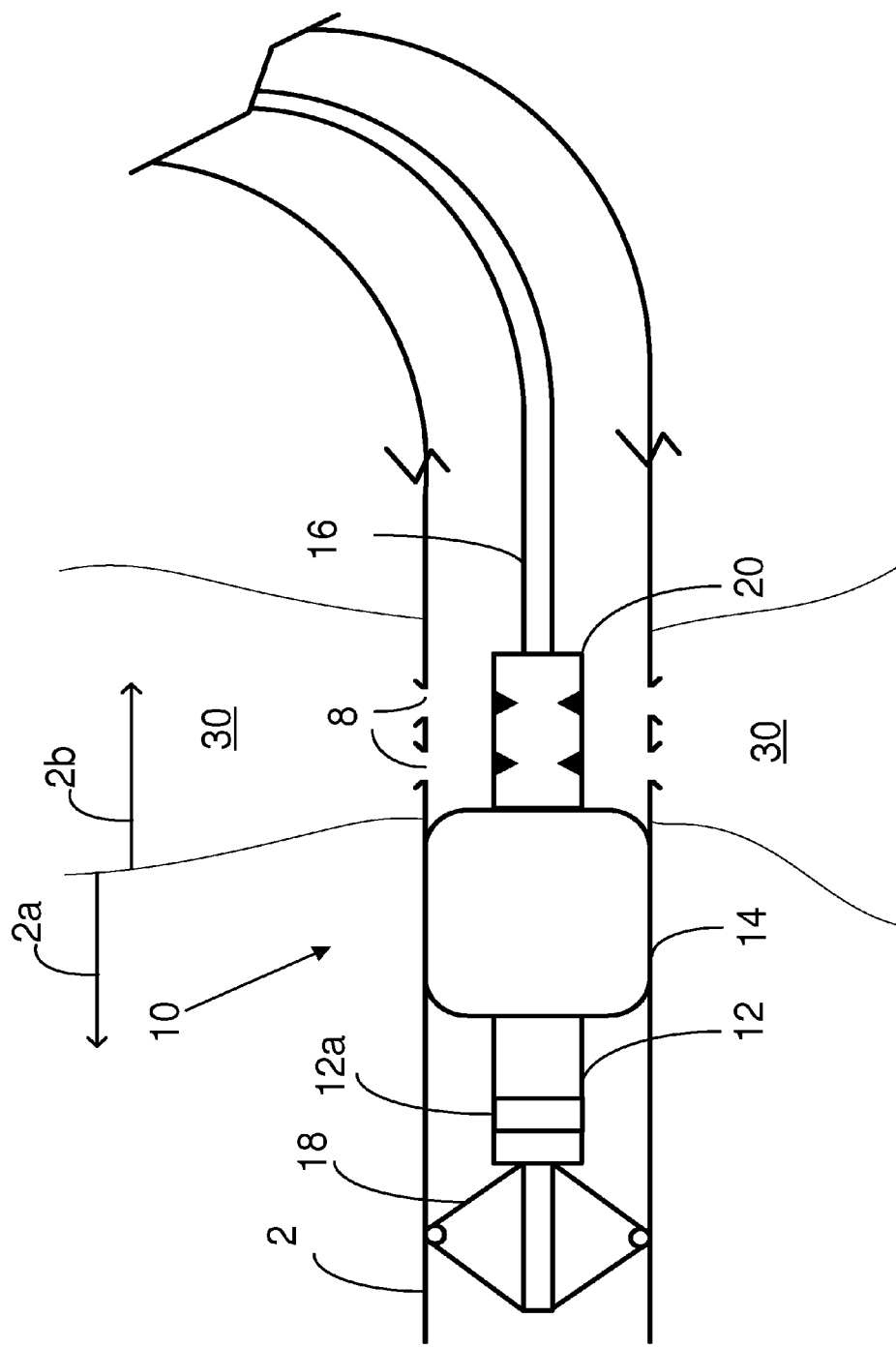
FIG. 4 is a cross-sectional view of an imaging device having a radially configured phased array ultrasonic transducer, an isolation system and a perforating system located in a wellbore having perforations in accordance with one embodiment of the invention.

In one specific embodiment, shown in FIG. 4, the imaging system 10 includes an isolation element 14 to integrate the imaging system with fracturing operations. The isolation element 14 is located uphole from the imaging system 12 having a radially configured transducer array 12a. In operation, the imaging device 10 is deployed downhole into the wellbore 2 prior to fracturing operations, with the imaging system 12 and isolation element 14 located downhole from the producing zone 30 which is to be fractured. The isolation element is activated or set to create a tight annular seal within the wellbore liner string to seal a downhole section 2a of the liner string from an uphole section 2b during fracturing operations and to shield the imaging system contact with high pressure and abrasive fracturing fluids located on the upstream side of the isolation during hydraulic fracturing operations, thereby prolonging the life and reliability of the imaging system. The isolation element can be one of several types of isolations that are used in fracturing operations, such as expandable and resealable/resettable packers and plugs which can be expanded and contracted multiple times without a loss of pressure isolation ability.

As shown in FIG. 4, the imaging device 10 may optionally include a perforating system 20 positioned uphole of the isolation element 14 for creating perforations 8 in the liner and/or casing during fracturing operations. In one embodiment, the perforating system is a perforating gun containing charges/explosives. Examples of various perforating systems include high pressure sand, acid, burst discs and explosives.

Method of Measuring Flowback

Figure 5:
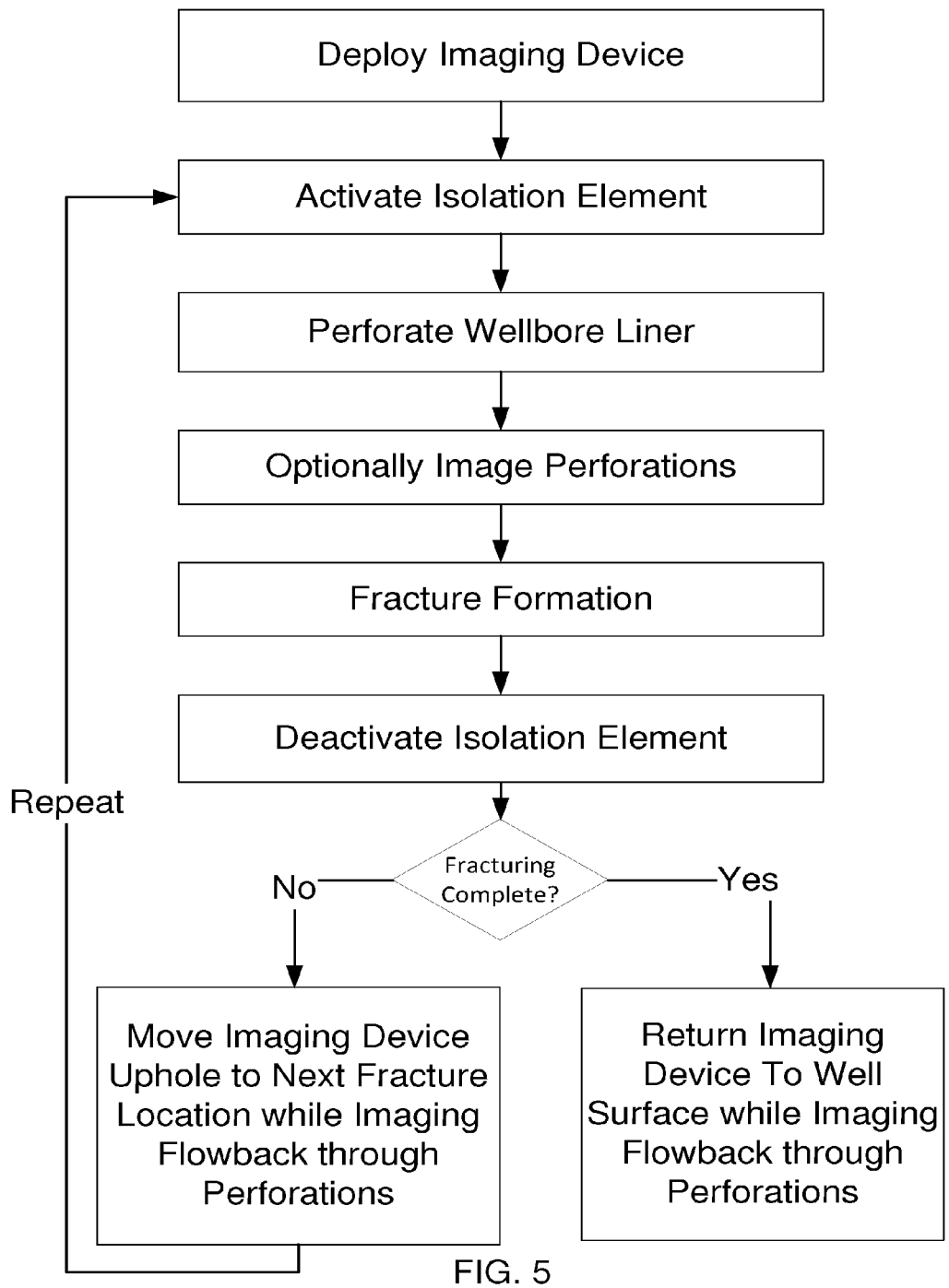
FIG. 5 is a flowchart showing a method for measuring flowback after fracturing operations using an imaging device having a phased array ultrasonic transducer in accordance with one embodiment of the invention.

In an exemplary scenario illustrated by the flowchart in FIG. 5, flowback into the well liner can be measured using an imaging device having a radially configured phased array ultrasound transducer in Doppler mode.

Referring to FIG. 5, after a well has been drilled and a casing and liner string have been run into the well, the imaging device 10 having a ring-shaped transducer array is run into the liner string to the desired location, placing the isolation element and imaging system downhole of the area to be fractured. The isolation element in the imaging device is activated to seal a downhole section of the liner string from an uphole section. Perforations are created using known perforation techniques, followed by fracturing operations. Immediately after the first stage of fracturing is complete, the isolation element is deactivated and the imaging device 10 is moved uphole to the recently fractured area. The phased array radial transducer is operated in Doppler mode to measure the flowback through the perforations to provide information on the effectiveness of the fracturing operation and the production zone. The phased array radial transducer may also be simultaneously operated in B-mode to provide an image of the well liner and perforations. Imaging can occur as the device is moved uphole to the next fracturing zone or the well surface.

Optionally, additional Doppler and/or B-mode images of the area to be fractured can be generated after perforations are created but prior to the injection of fracturing fluid to determine the flow through the perforations prior to fracturing. This is done by upsetting the isolation element after perforating the liner, moving the imaging system uphole to the perforations, generating the desired images then moving the imaging device back downhole and re-setting the isolation element prior to fracturing.

Additionally, while the imaging device is being run into the wellbore, the imaging system can capture a Doppler and/or B-mode image of the liner string to determine flow in the wellbore and the condition of the string prior to perforating the liner.

Further Applications of the Radially Configured Ultrasonic Transducer

A further application for the imaging device having a radially configured phased array Doppler ultrasound transducer is to measure flow out of the well. This can be especially valuable during water injection applications wherein water injected into the wellbore flows into the producing formation from the wellbore to increase the formation pressure and stimulate production.

Forward Facing Configuration of Phased Array Doppler Ultrasound Transducer

In another embodiment of the invention, the imaging system 12 comprises a forward facing phased array ultrasonic transducer 12b which emits ultrasonic waves outward from the downhole end of the imaging device 10 and generally parallel with the longitudinal axis of the wellbore, as shown by the arrows 22b in FIG. 1. While FIG. 1 illustrates the imaging device 10 having both a forward facing transducer array 12b and a radially configured transducer array 12a, it is to be understood that the imaging device may include either or both of the forward facing transducer array 12b and a radially configured transducer array 12a.

When the forward facing transducer array 12b is operated in Doppler mode, it measures axial flow through the wellbore, i.e. it captures fluid velocities for fluid flowing parallel to the walls of the wellbore.

When the forward facing transducer array is operated in B-mode, a B-mode image of the wellbore is generated that can provide information on the well liner diameter and integrity, as well as the location and acoustic impedance ratios of phase boundaries/interfaces between fluid types. In the B-mode image, a user will be able to see where different fluid boundaries are located based on the differences in acoustic impedances between fluid phases. The user can then determine or infer what each layer is based on the acoustic impedances of the layers and/or the user's general knowledge of fluid flow characteristics and fluid densities in wellbores (e.g. oil floats on water). The B-mode image can also provide a user information on the presence of gas bubbles and/or solid particles within different phases.

Figure 6:
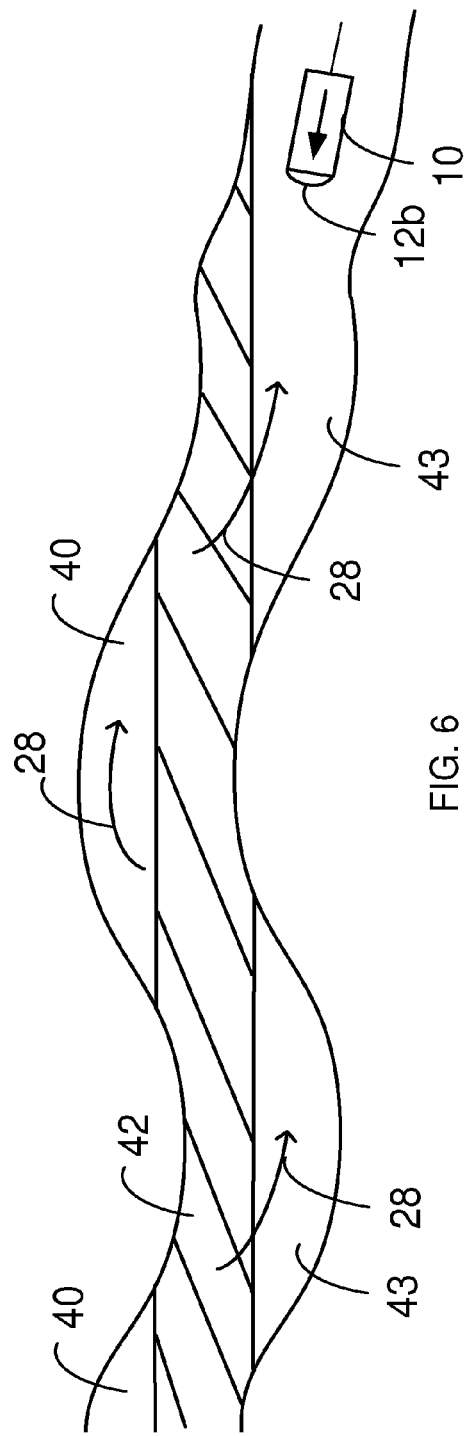
FIG. 6 is a cross-sectional view of a deviated wellbore having stratified multiphase fluid flow and an imaging device having a forward facing phased array ultrasonic transducer in accordance with one embodiment of the invention.

FIG. 6 illustrates a deviated wellbore having multiphase stratified flow in the form of gas 40, oil 42 and water 43 flowing in an uphole direction shown by arrows 28. As the imaging device 10 having a forward facing transducer array 12b moves through the wellbore 2, it can detect the speed and direction of each fluid phase moving through the wellbore in a generally longitudinal direction using the Doppler mode, and the phase boundaries can be determined by the B-mode. The fluid flow and phase boundary information can be used to calculate "holdup" in the wellbore. Since the transducer does not measure flow perpendicular to the emitted wave front, the forward facing transducer can provide clear and valuable information on axial flow and phase boundaries without being clouded by radial flow measurements.

Imaging Device with Multiple Phased Array Ultrasonic Transducers

In one embodiment, shown in FIG. 1, the imaging device 10 includes both a forward facing transducer array 12b and a radially configured transducer array 12a. Simultaneously generated imaging information from both arrays in Doppler and/or B-mode can be combined to create a complete 3D image of the wellbore showing the geometry of the wellbore liner, radial fluid flow, axial fluid flow, and phase boundaries.

Additional Features of the Imaging Device

Centralizing Elements

The imaging device 10 may also include one or more centralizing element for keeping the imaging device in the center of the wellbore. FIG. 1 illustrates one embodiment of a centralizing element 18, wherein the element includes centralizing rods that extend outwardly and abut the inner wall of the well casing or liner to keep the imaging device in the center of the wellbore.

Deployment System

The imaging device includes a deployment system 16 for running the imaging device 10 into the wellbore and removing the device from the wellbore. Generally, the deployment system is a wireline or coiled tubing that may be specifically adapted for these operations. Other deployment systems can also be used, including downhole tractors and service rigs.

Power & Memory System

The imaging system can be powered by an electric cable run from the well surface or by onboard batteries. The data from the imaging system can be conveyed uphole to the well surface through a transmission line for immediate viewing of the images in real-time. The data may also be stored onboard the imaging device for later retrieval in the event of a communication loss. The imaging system may record images continually or it may be triggered manually and/or automatically, such as through the use of movement triggers.

Other Elements

The imaging device may also include additional features for providing further information. For example, one or more mechanical spinners may be included on the device for calibrating the imaging device for flow. Resistive, capacitive or optical sensors may also be included to calibrate the imaging device for the identification of fluids and phase boundaries.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A downhole imaging system for logging a wellbore comprising:
   a downhole tool having a downhole-facing ultrasound transducer array for emitting ultrasound waves in Doppler mode in a downhole direction, the downhole-facing ultrasound transducer array comprising a phased array of transducer elements;
   electronics for receiving ultrasound reflections and recording them as Doppler mode data on a memory of the tool;
   at least one resistive, capacitive, or optical sensor exposed to a multiphase fluid in the wellbore; and
   a processor arranged:
   a) for processing the Doppler mode data to calculate axial fluid flow in the wellbore,
   b) for identifying phase boundaries in the multiphase fluid in the wellbore based on B-mode image data, and
   c) for generating an image representing the calculated axial fluid flow and identified phase boundaries.

2. The system of claim 1, the processor further arranged to calculate holdup in the wellbore from the calculated axial fluid flow and the identified phase boundaries.

3. The system of claim 1, wherein the ultrasound transducer array is further arranged to emit ultrasound waves in B-mode, wherein the electronics further receiving the ultrasound reflections and record them as B-mode data on the memory of the tool;
   and wherein the processor is further arranged for processing the B-mode data to identify phase boundaries of multiphase fluid in the wellbore.

4. The system of claim 3, the processor further arranged to process the B-mode data to determine the structure of the wellbore and create an image of the wellbore.

5. The system of claim 3, wherein the phase boundaries are identified based on differences in acoustic impedances of the fluids of the wellbore.

6. The system of claim 3, wherein the ultrasound transducer array is operable simultaneously in Doppler mode and B-mode.

7. The system of claim 1, the processor further arranged to generate an image of the wellbore, overlaying the calculated axial fluid flow and identified phase boundaries.

8. The system of claim 1, wherein a transmitted frequency of the ultrasound transducer array is adjustable based on a velocity of the downhole imaging system and/or the calculated axial fluid flow in the wellbore.

9. The system of claim 1, further comprising at least one mechanical spinner for calibrating the calculated axial fluid flow.

10. The system of claim 1, wherein the phased array of transducer elements are generally arranged in parallel and wherein, when operated in Doppler mode, the downhole-facing ultrasound transducer array is configured to pulse the transducer elements in sequence.

11. The system of claim 1, wherein the processor is further arranged for calibrating the downhole-facing ultrasound transducer array based at least in part on the at least one resistive, capacitive, or optical sensor.

12. A method of logging a wellbore comprising:
    emitting ultrasound waves in Doppler mode in a downhole direction using a downhole-facing ultrasound transducer array on a downhole tool, the downhole-facing ultrasound transducer array comprising a phased array of transducer elements;
    receiving ultrasound reflections and recording them as Doppler mode data on a memory of the downhole tool;
    exposing at least one resistive, capacitive, or optical sensor to a multiphase fluid in the wellbore and receiving sensor data on the memory of the tool; and
    processing the Doppler mode data to calculate axial fluid flow in the wellbore, identifying phase boundaries in the multiphase fluid in the wellbore based on B-mode image data, and
    generating an image representing the calculated axial fluid flow and identified phase boundaries.

13. The method of claim 12, the processes further calculating holdup in the wellbore from the calculated axial fluid flow and the identified phase boundaries.

14. The method of claim 12, emitting ultrasound waves in B-mode using the ultrasound transducer array, receiving the ultrasound reflections and recording them as B-mode data on the memory of the tool; and processing the B-mode data to identify phase boundaries of multiphase fluid in the wellbore.

15. The method of claim 14, processing the B-mode data to determine the structure of the wellbore and creating an image of the wellbore.

16. The method of claim 14, operating the ultrasound transducer array simultaneously in Doppler mode and B-mode.

17. The method of claim 14, wherein the phase boundaries are identified based on differences in acoustic impedances of the fluids of the wellbore.

18. The method of claim 12, generating an image of the wellbore, overlaying the calculated axial fluid flow and identified phase boundaries.

19. The method of claim 12, adjusting a transmitted frequency of the ultrasound transducer array based on a velocity of the downhole tool and/or the calculated axial fluid flow in the wellbore.

20. The method of claim 12, calibrating the calculated axial fluid flow using a mechanical spinner.

* * * * *